Inventor
Frederick Kohnle
By Wood & Wood
Attorneys

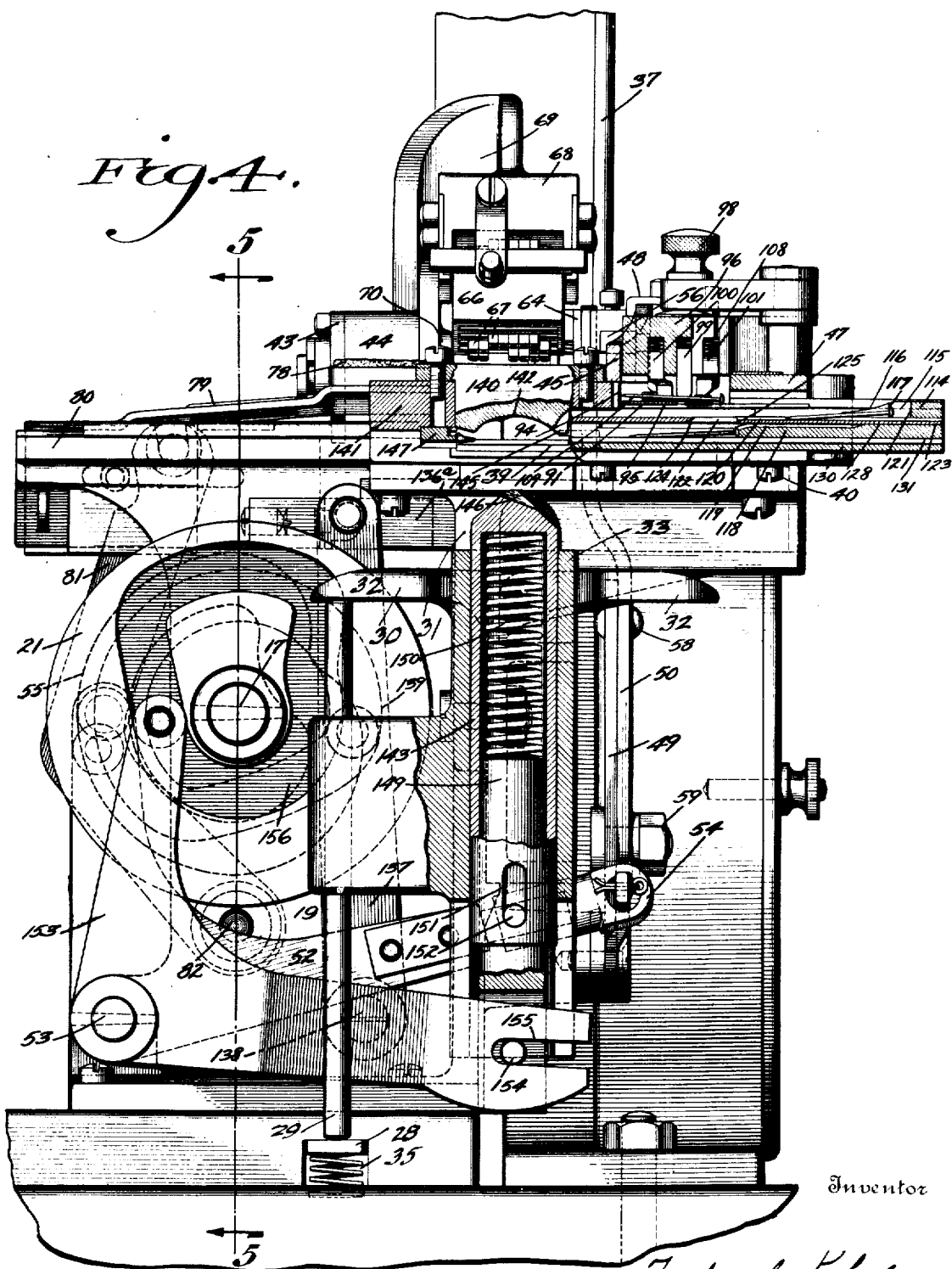

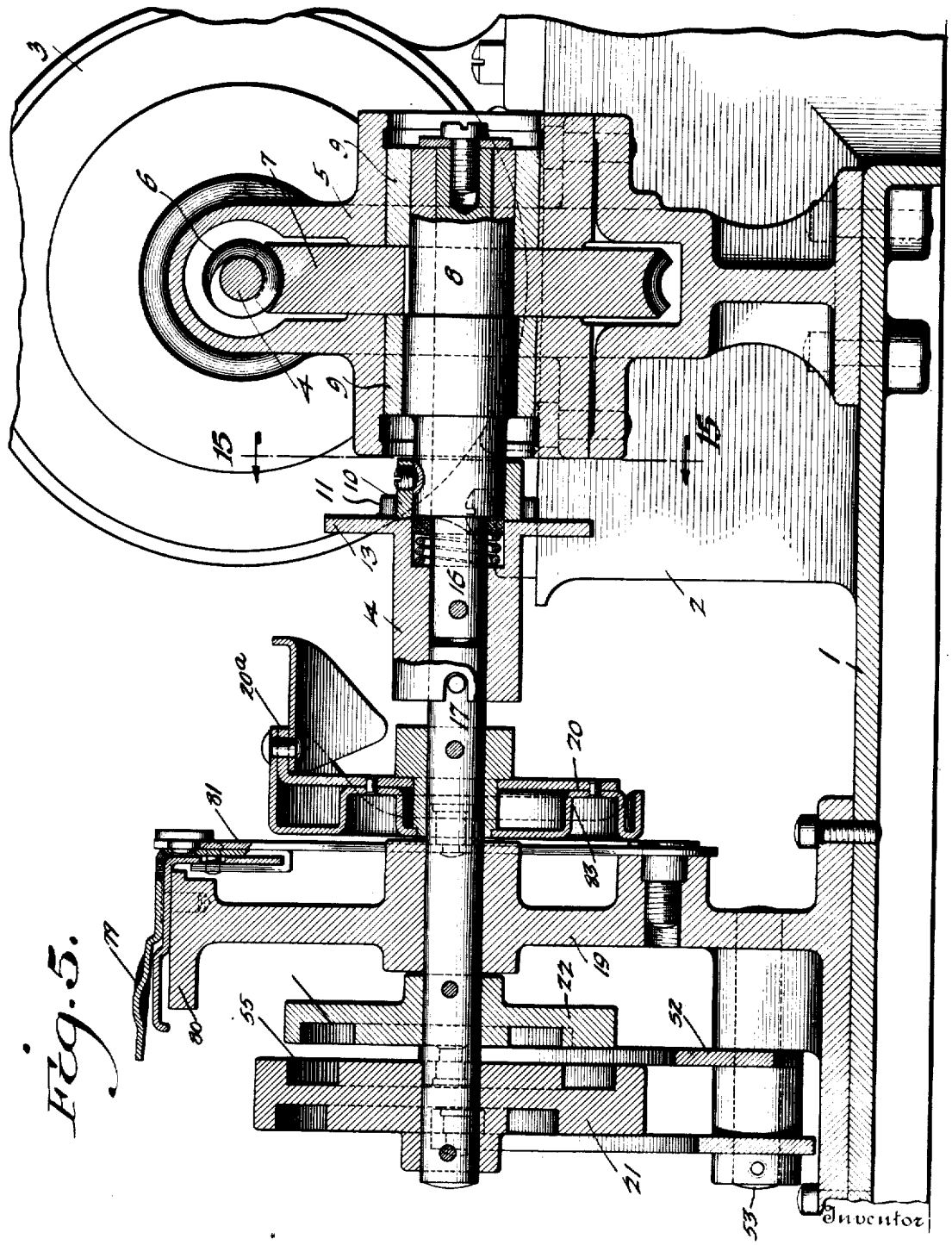

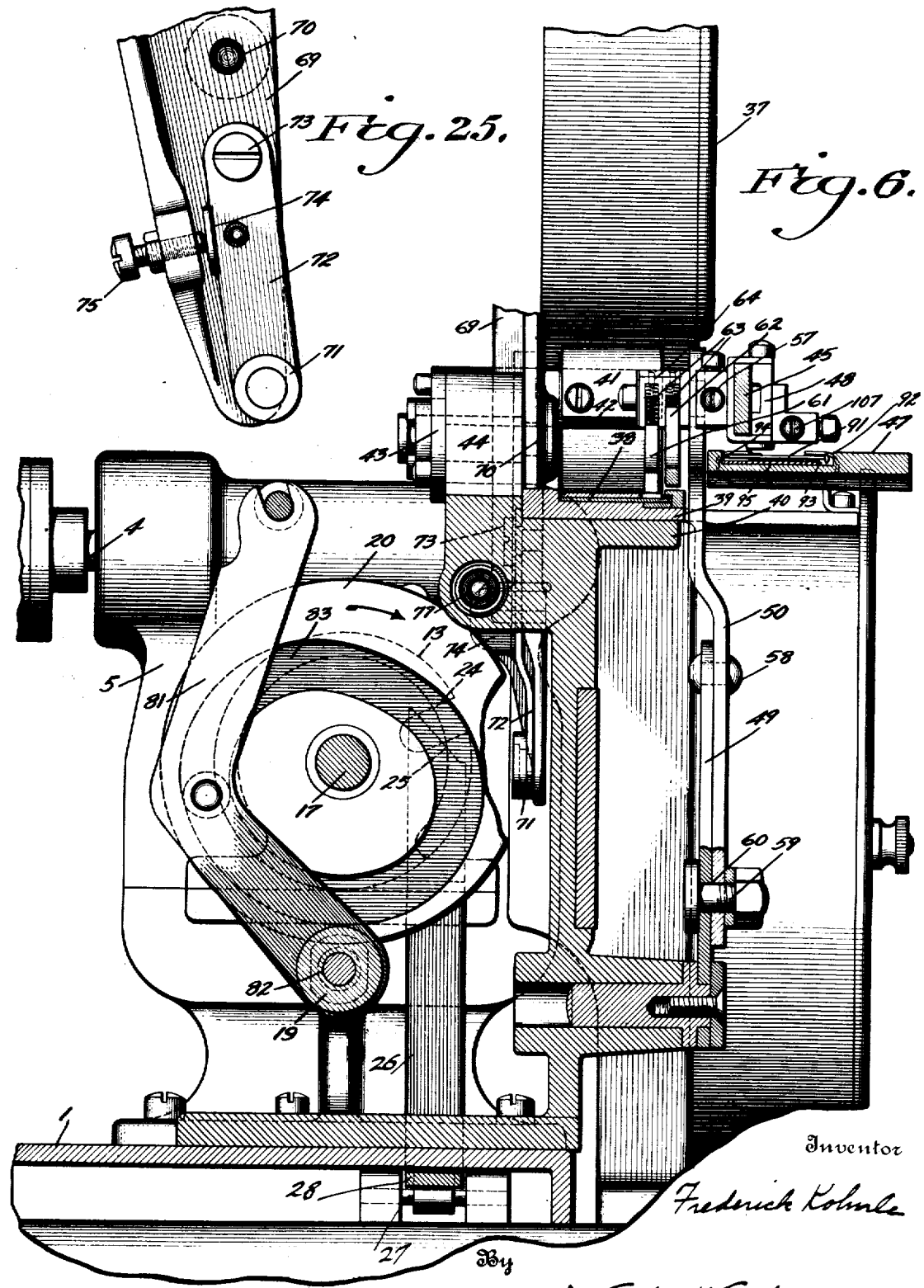

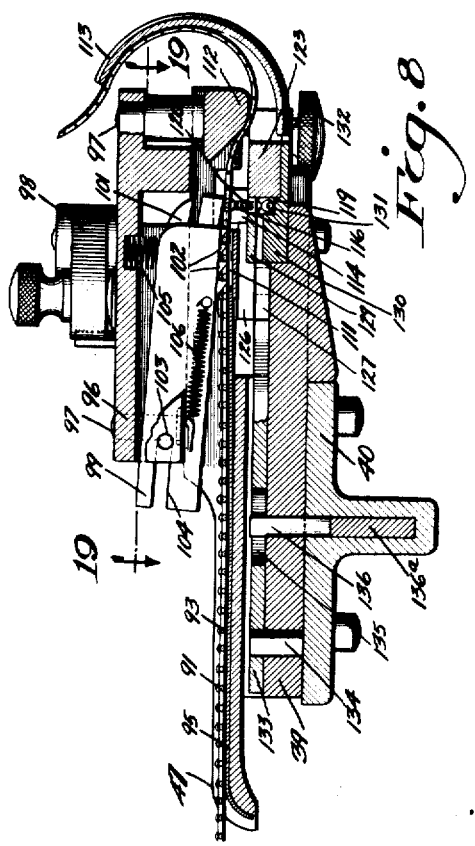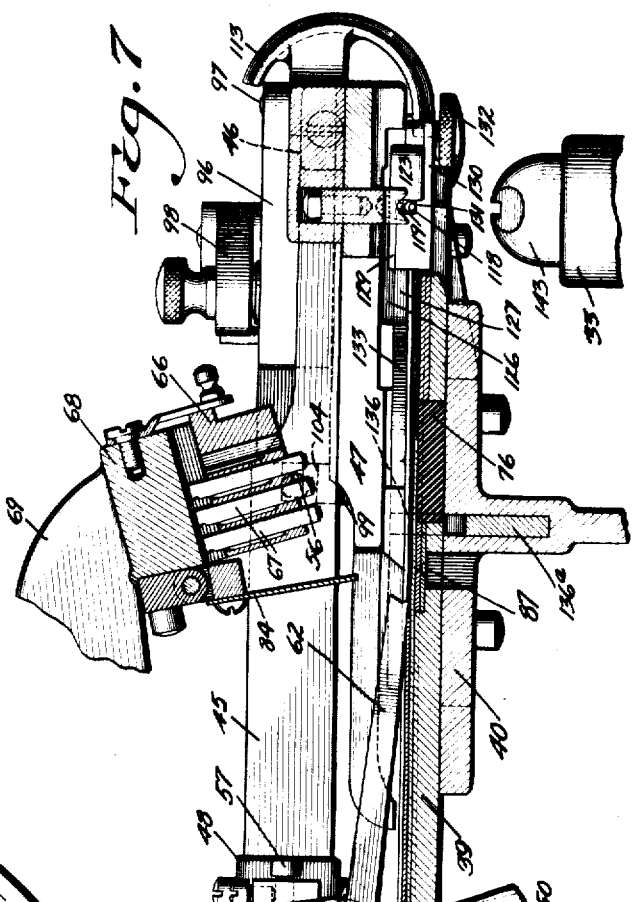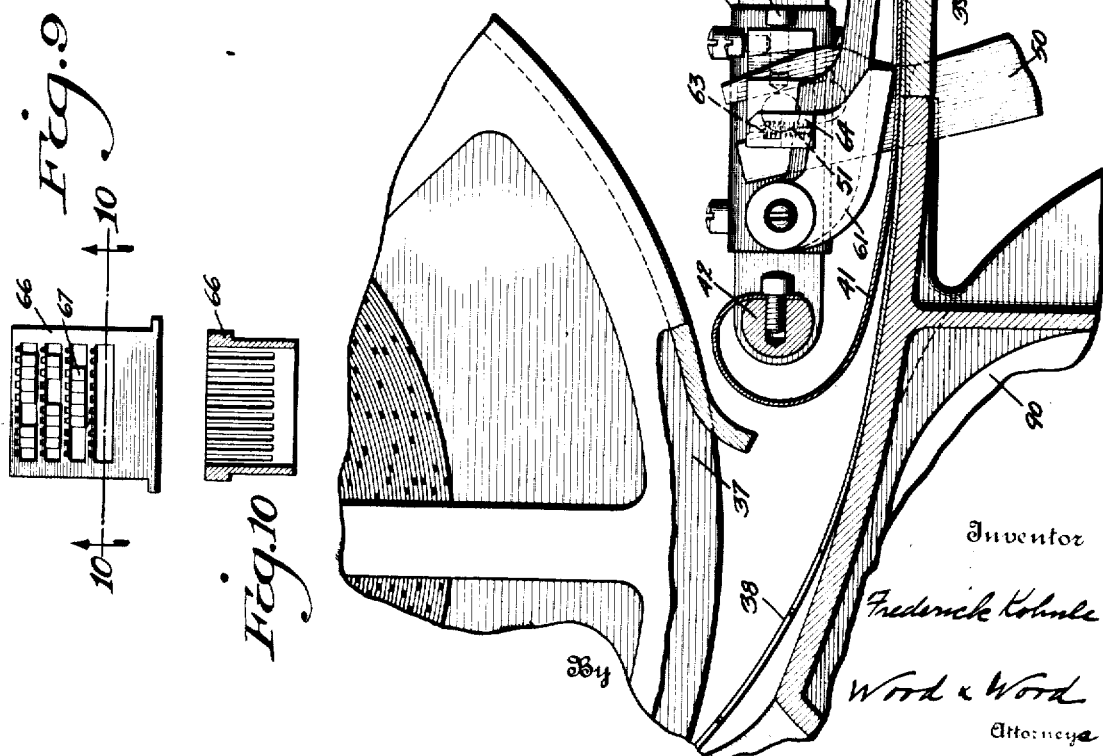

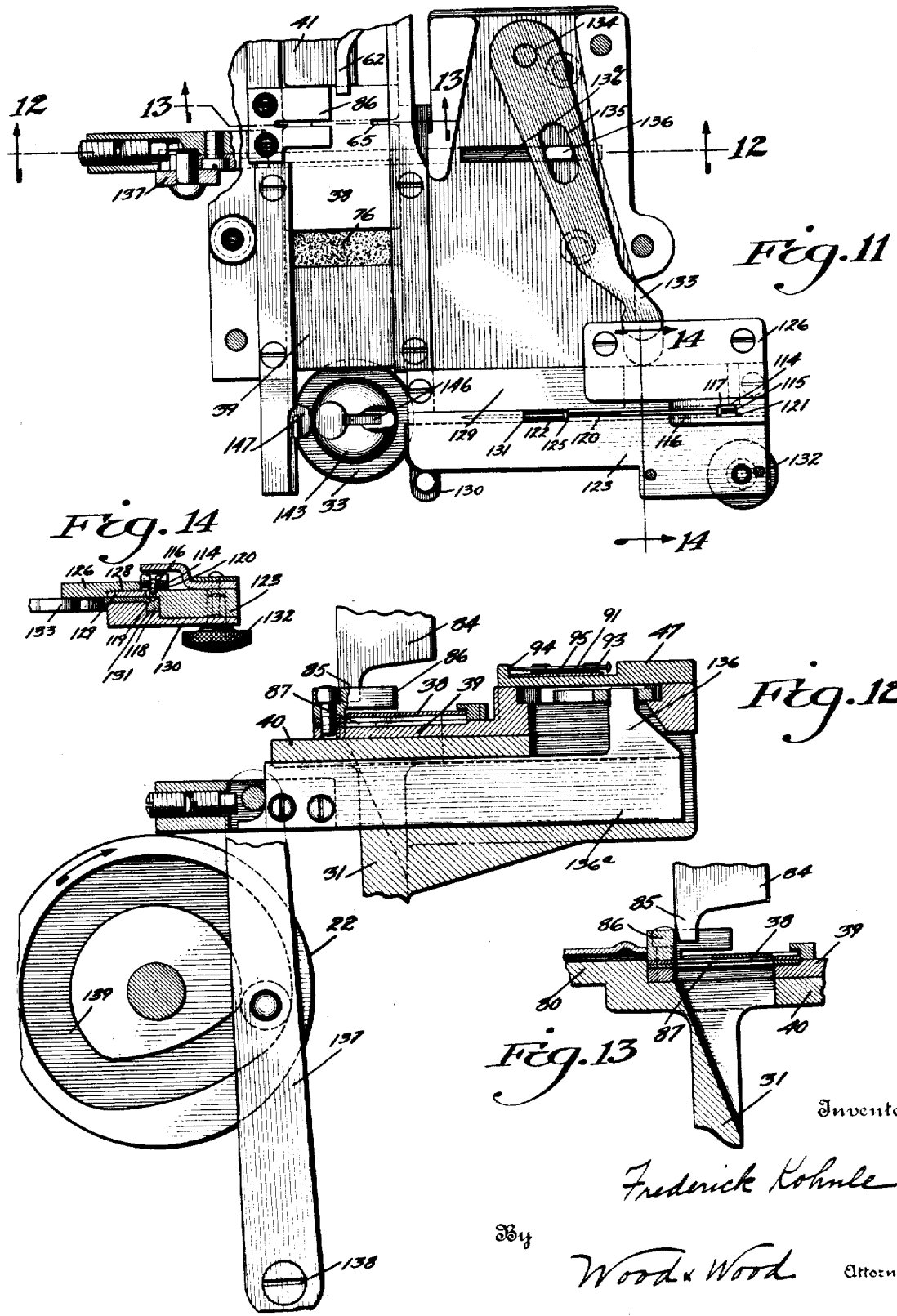

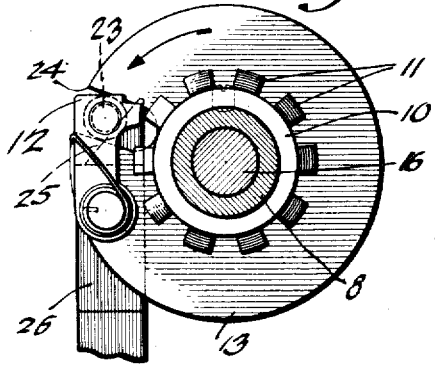
Fig.15
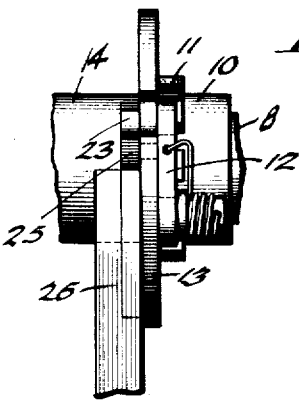
Fig.16
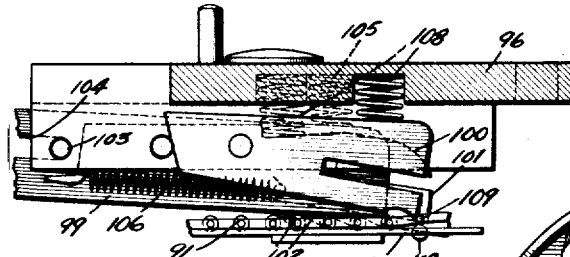
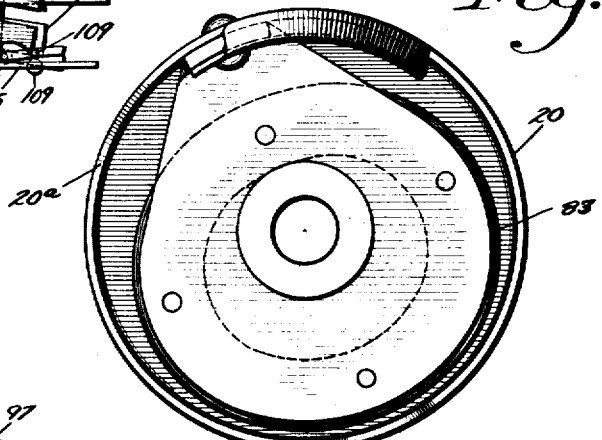
Fig.17
Fig.18
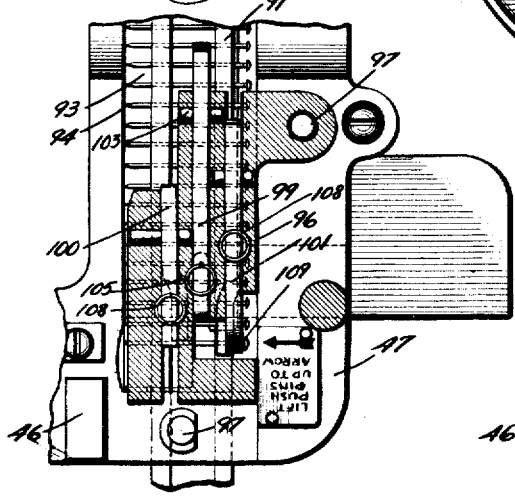
Fig.19
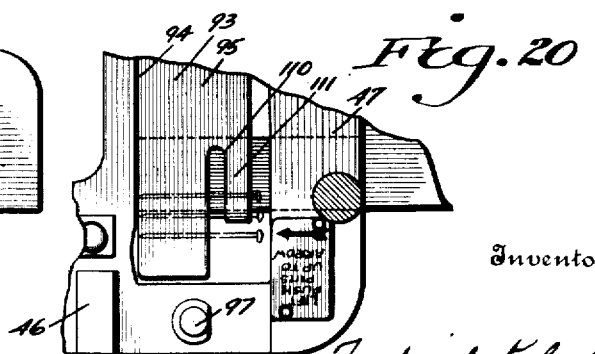
Fig.20
Inventor
Frederick Kohnle
By
Wood & Wood. Attorneys May 1, 1928.  
F. KOHNLE  
TICKET OR TAG ATTACHING MACHINE  
Filed Dec. 5, 1925  
1,667,810  
11 Sheets-Sheet 10
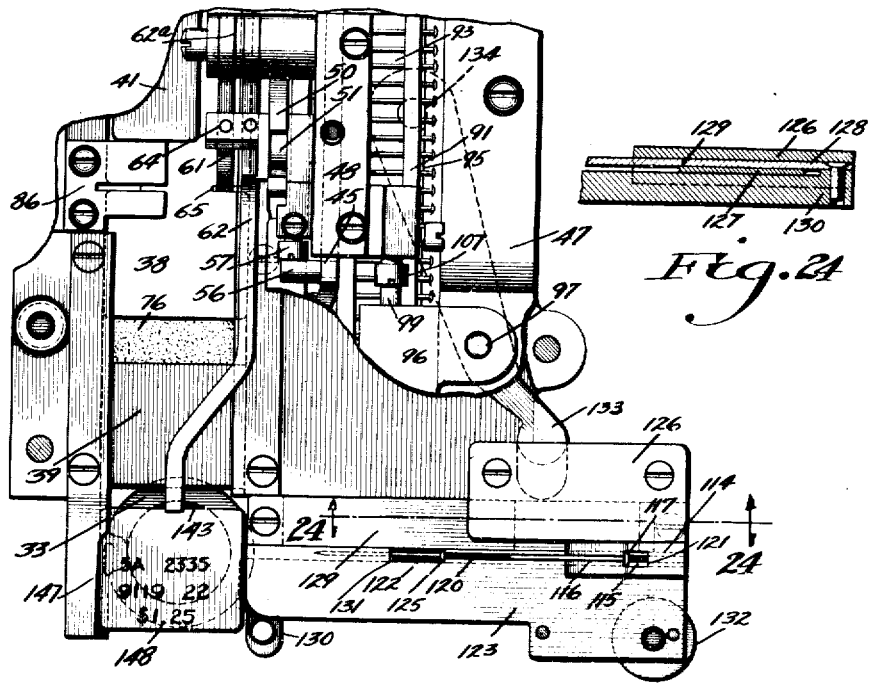
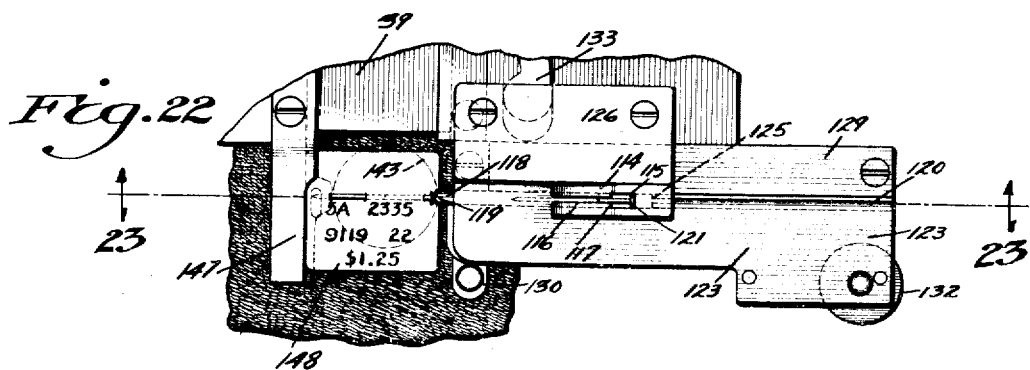
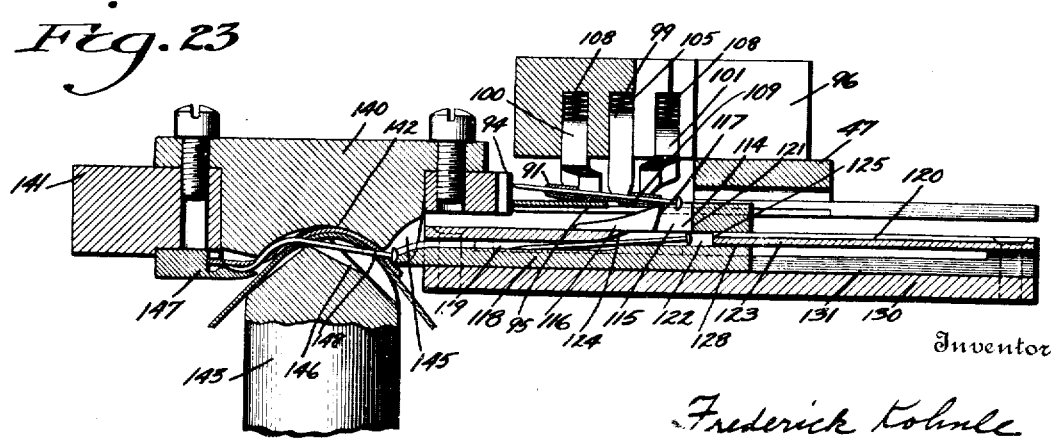
Inventor  
Frederick Kohnle  
By  
Wood & Wood  
Attorneys

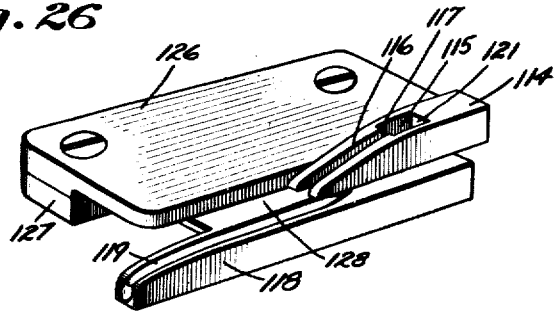
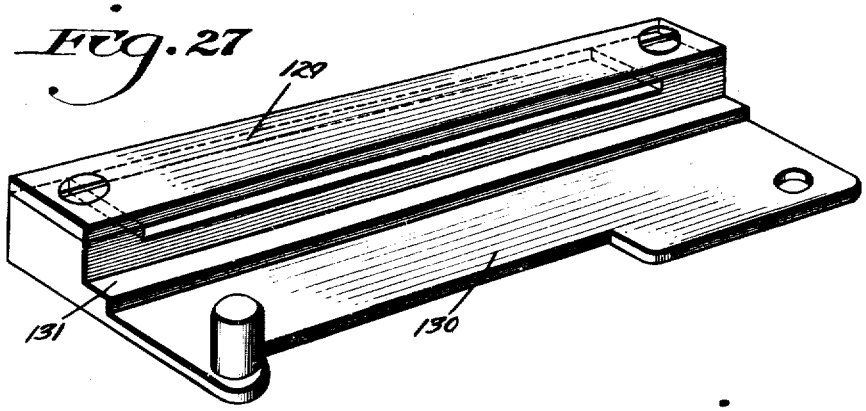
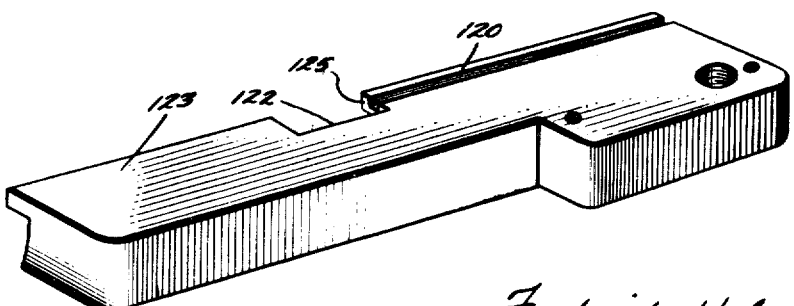

Patented May 1, 1928.

1,667,810

UNITED STATES PATENT OFFICE.

FREDERICK KOHNLE, OF DAYTON, OHIO, ASSIGNOR TO THE MONARCH MARKING SYSTEM COMPANY, OF DAYTON, OHIO, A CORPORATION OF OHIO.

TICKET OR TAG ATTACHING MACHINE.

Application filed December 5, 1925. Serial No. 73,512.

This invention relates to tag price marking and applying machines and particularly to a type of machine in which the commercial pin is used as a fastener for securing the tags to the goods to be ticketed. The machine is designed to practice the method of securing price marking tags upon fabric or like merchandise, as set forth in Patent No. 1,528,023 issued to me March 3, 1925.

The method as described in this patent consists in passing a common pin several times through a tag and material to which the tag is applied, preferably entering from the face side of the tag so that when the pin has been fully inserted, the head thereof is exposed to the face side of the tag, crimping the pin and bending or inclining the point thereof toward or into the tag from the reverse side of the tag to prevent accidental withdrawal of the pin, and for sheathing or guarding the point. The crimping of the pin and the inclining of the point, efficiently secures the tag to the goods, although the pin is capable of being withdrawn for the purpose of removing the tag.

The machine operates upon the tags arranged in gang form or strip length, reel wound, the strip being notched transversely at definitely spaced intervals, designating the tag widths and providing shoulders for engaging the strip to feed the same in step degrees beneath the printing, marking and severing mechanisms, and advancing the foremost tag to a station for pinning the tag to the goods to be ticketed.

The pins are removably held, in consecutively spaced parallel relation upon a tape, adapting the pins to be progressively engaged, advanced and operated upon, for insertion into a price marked tag and goods, for securing the tag and goods.

In the preferred arrangement, the pins are consecutively, longitudinally extracted or pulled from the tape in one stroke motion of a reciprocating extractor as a member of a shuttle mechanism which engages with the head of the pin, and in reverse stroke of the extractor, the pin is moved forwardly for depositing the pin in a channel or guideway in front of a driver element. The driver and extractor occupy a superposed relation, and are combined and operate as a unit, whereby one pin is extracted from the tape and a second positioned for driving, at each returned stroke of the extractor and driver. The forward stroke of said unit transfers or conveys a pin from the extractor to a channel formed in the upper side of the driver and a second pin in front of the driver is driven through the tag and material to be ticketed. This provides a pin feed for high speed operations.

A general object is therefore to provide a machine for marking price tags and applying the tag to flexible merchandise material and securing the same by means of a common pin, having opposite pointed and headed ends, the pin having appropriate crimps to prevent accidental withdrawal from the tag and goods, and the point thereof pricked into the underside of the tag.

Another object is to provide for automatically feeding tags and pins toward a pin driving and tag holding device, so that one pin only may be positioned and driven into or passed through each tag.

Another object is to provide a machine in which tags in strip form can be used, and in which the strip of tags is automatically advanced, a tag severed from the strip, and the severed tag advanced to pin receiving position.

Another object is to provide means for substantially simultaneously severing and printing each tag preparatory to advancing the same to pin-receiving position.

Another object is to provide means for synchronizing movements of the various cooperable parts of the machine to obtain a maximum rapidity of operation with a minimum of wear to the machine parts.

Another object of the invention is to provide shuttle means for successively transferring the pins from a pin carrying tape or web to the tag and material appropriately held between clamping dies for securing the tag to the material, the dies being arranged to suitably shape pin insertion through the tag and material to sufficiently anchor its point end into the tag or protect the same against protrusion.

Another object is to provide means for manually initiating a clutch operation, for connecting the machine with power which manually operable means is formed and disposed to support the goods to be tagged and assist in holding the goods in taut condition to facilitate introduction of the pin through tag and goods.

Another object is to provide automatically releasable clutch mechanism adapted to automatically disconnect the power from the machine at the end of each operative cycle of the machine.

Other objects and certain advantages will be more fully set forth in the description of the accompanying drawings forming a part of this specification, and in said drawings:

Figure 4 is a vertical cross section through the anvil, tag holding and pin pulling and driving mechanisms, approximately on line 4—4 of Figure 3.

Figure 5 is a vertical longitudinal section on line 5—5 of Figure 4, showing the main driving shaft, and cams thereon for operating and synchronizing the movements of the various elements, and clutch mechanism.

Figure 6 is a vertical cross section approximately on line 6—6 of Figure 2, showing the relations of the printing arm and inking slide operating levers to their cams.

Figure 7 is a longitudinal vertical section through the tag strip guideway on line 7—7 of Figure 2, showing the relations of the feeding pawls to the tag strip, as well as the relation of the cutting blade and cutting and printing head, and also the relations between the anvil and tag stopping and positioning elements at the outer extremity of the guide.

Figure 8 is a fragmentary longitudinal section on line 8—8 of Figure 2, illustrating the relation of the pin strip advancing dog to the pin strip, and to the path of reciprocation of the pin puller and driver elements.

Figure 9 is a plan view of the type chase.

Figure 10 is a section on line 10—10 of Figure 9.

Figure 11 is a plan view of the front portion of the machine, with the pin strip slide supporting plate removed, showing the extractor or puller, and driver slide operating lever, and manner of adjustably connecting the lever with its cam actuated operating element.

Figure 12 is a vertical section on line 12—12 of Figure 11, further illustrating the construction of that figure.

Figure 13 is a section on line 13—13 of Figure 11, showing the relation of the knife to the strip tag guideway, and the means for disposing of the cuttings.

Figure 14 is a detail cross section on line 14—14 of Figure 11, showing the construction of the pin puller and driver unit.

Figure 15 is a cross section on line 15—15 of Figure 5, illustrating the clutch and the main transmission shaft.

Figure 16 is an edge view of the clutch.

Figure 17 is a face view of the cam for operating the type arm and inking slide.

Figure 18 is a view similar to Figure 8, of the pin strip feeding mechanism, showing the relation of the pin strip holding pawl to the strip.

Figure 19 is a plan section on line 19—19 of Figure 8, showing the relation of the pin strip advancing, holding and depressing pawls to the strip.

Figure 20 is a plan view showing a terminal portion of the bottom of the pin strip guideway and relation of the outermost pin thereto, the pin being shown in dot-and-dash lines.

Figure 21 is a plan showing a tag positioned over the anvil, with the pin driver and puller element fully retracted.

Figure 22 is a view similar to Figure 21, showing the driver and puller element fully advanced, and a pin driven through and securing tag and goods.

Figure 23 is an enlarged vertical section on line 23—23 of Figure 22.

Figure 24 is a section on line 24—24 of Figure 21, through the slide.

Figure 25 is a detail face view of the lower end of the printing lever, showing the means employed for adjusting and regulating the throw thereof.

Figure 26 is a perspective view of the shuttle mechanism comprising the pin extractor for extracting the pin from the tape, and the pin driver for driving the pin through the tag and material.

Figure 27 is a perspective view of the base plate and guide for slidably mounting the shuttle mechanism.

Figure 28 is a perspective view of the pin guide or race-way plate for receiving the pin after the extractor has pulled it from the tape and for transferring the pin from the claw or exractor to the driver.

Figure 1:
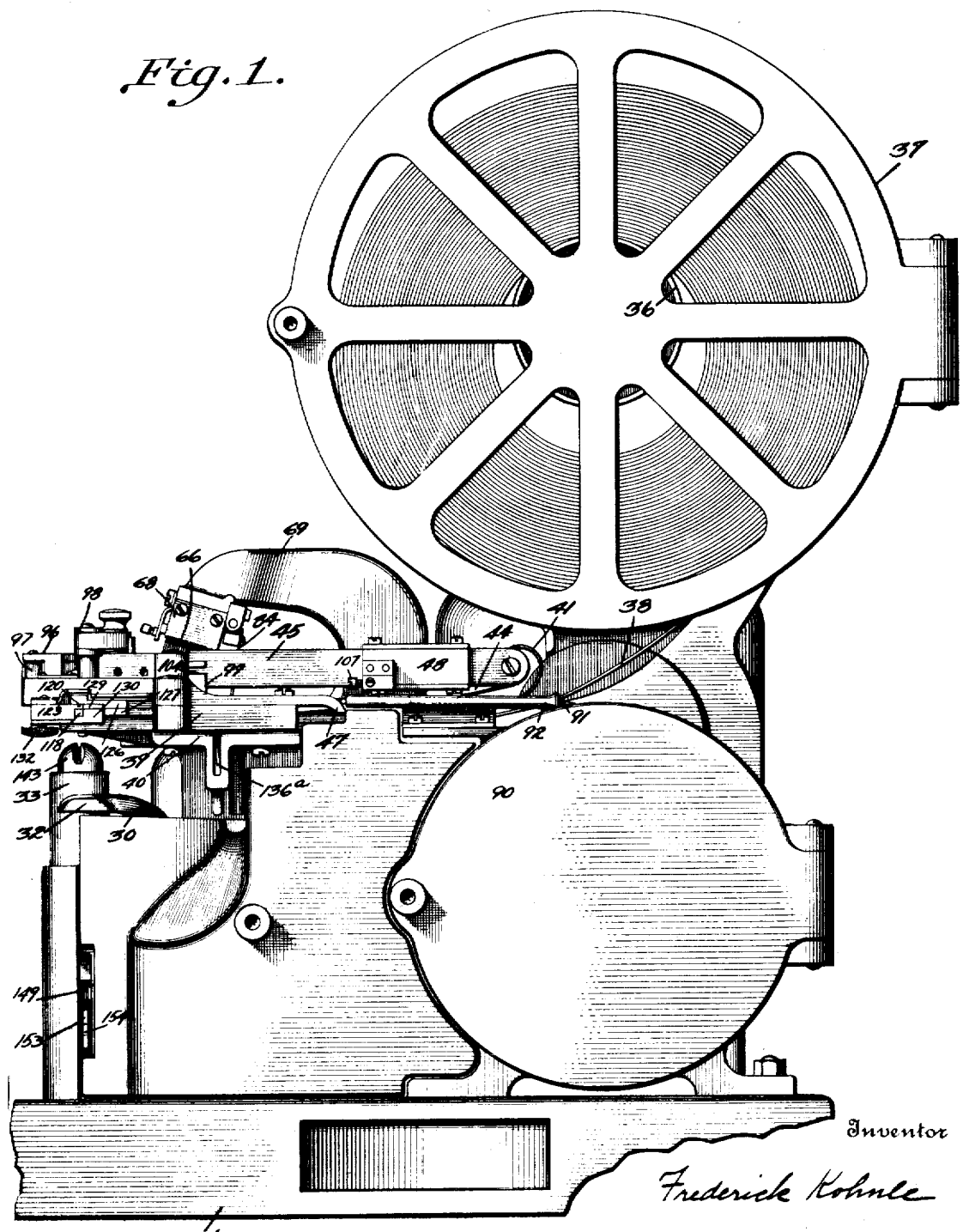
Figure 1 is a general side elevation of the machine.

The machine as illustrated is of a design adaptable for electric motor drive, under a mechanical clutch control, with the control through a lever yoked about or reaching upon opposite sides of an anvil upon which the goods to be ticketed is placed and held while being pinned. This brings the control at a point convenient to the operator, and the control device is capable of being manipulated by him while holding the goods upon the anvil in position to receive the price marked ticket.

Referring to the drawings, (see Figure 5) 1 indicates a base plate for the entire structure provided at one end with an elevated platform 2 upon which the electric motor 3 is mounted. The motor shaft, through a suitable coupling, connects with a worm shaft 4 journaled in the opposite ends of a bearing ing bracket or standard 5, the worm 6 of the feed shaft 4 meshing with a worm wheel 7 keyed upon a driver shaft 8, journaled in the bearing bracket or standard 5. The shaft is journaled in suitable bearing bushings 9 supported in the bearing bracket or standard 5, the bracket being shown as of two part construction with the upper portion provided with journals for the shafts and mounted upon the base or pedestal portion, for the convenience of manufacture. The forward end of the hollow shaft 8 has a ratchet collar 10 fixed thereto, with the ratchet teeth 11 of the collar adapted to be engaged by a spring pressed pawl 12 (see Figures 15 and 16) pivotally mounted upon an annular flange 13 of a coupling or clutch sleeve 14 pinned to a shaft 16 journaled within the hollow shaft 8, and also pinned to a shaft 17 coaxial with the shaft 16, journaled in a bearing standard 19 secured upon the base plate 1, the construction permitting the shaft 17 and its transmission elements to be assembled as a unit and removably connected with the shaft 16 as an assembly and manufacturing facility. The shaft 17 carries a number of cams fixed thereto; a double cam 20 for operating the printing and inking mechanism; a double cam 21 for operating the anvil and pin extractor and driver; and a single cam 22 for operating the feeding mechanism for both the tag and pin carrying strips.

Figure 3:
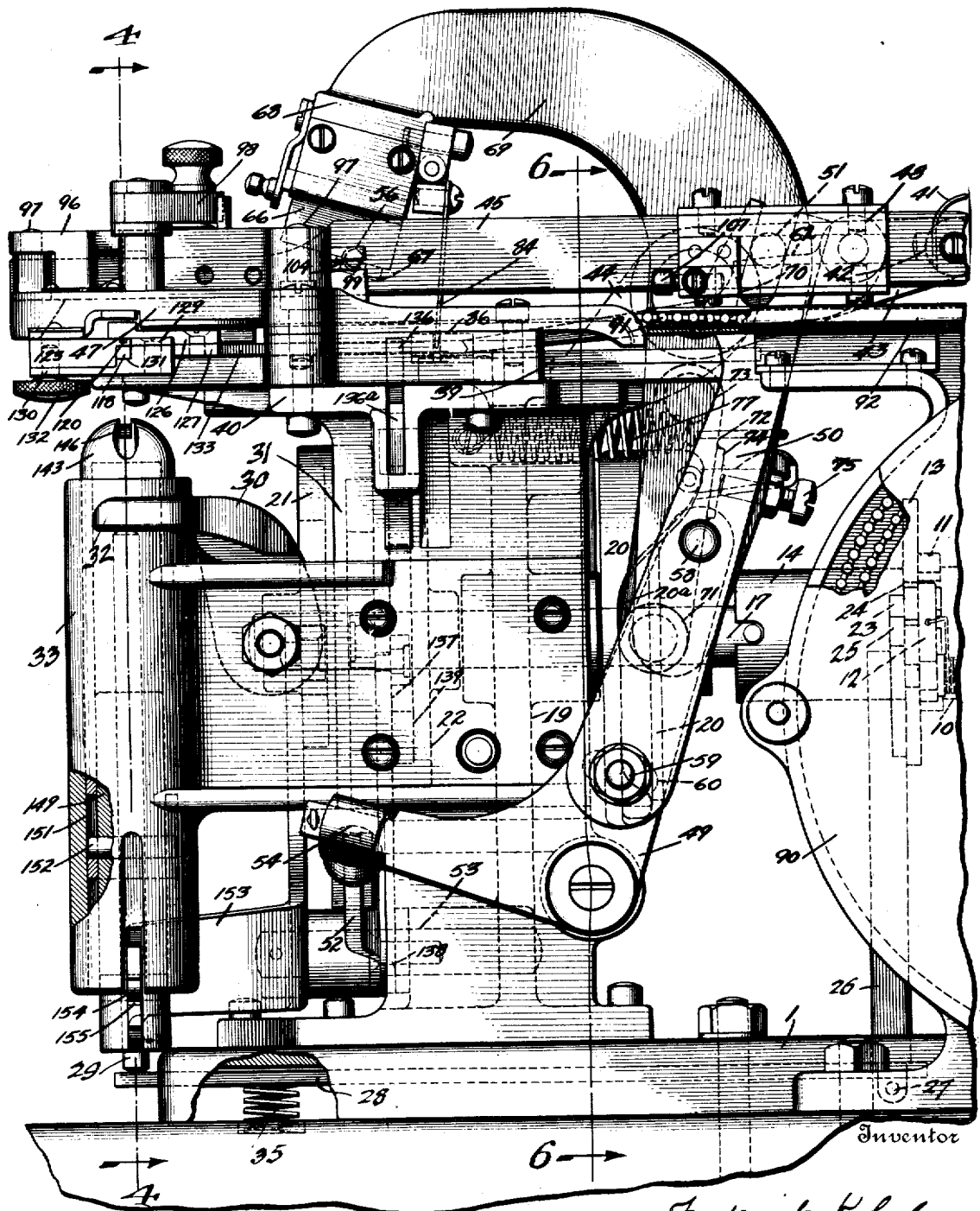
Figure 3 is a side elevation of the main or front portion of the machine, corresponding to Figure 2.

The pawl 12 (see Figures 15 and 16) has a pin 23 extending from one side thereof and through a notch 24 in the flange 13, for engagement with the inclined or wedge shape end 25 of a vertically disposed trip bar 26. The trip bar swings as a lever laterally (see Figure 3) toward and from the flange 13 and is pivoted at 27 to the base plate and is rigidly fixed or forms a part of a connecting link or arm 28 extending forwardly beneath a vertical plunger rod 29 (see Figures 3 and 4) parallel with the anvil at the front end of the machine. The wedge end 25 of the trip bar, when the trip bar is released is engaged by the pin 23, and through the rotation of the clutch sleeve 14 and its flange 13 which carries the pawl, causes the pawl to be swung outwardly and out of engagement with the ratchet teeth 11 thus breaking the driving connection between hollow shaft 8 and the driven shafts 16 and 17. Moving the trip bar outwardly from beneath the pin 23 releases the pawl 12 and permits the same to snap into engagement with the ratchet teeth 11.

The trip bar 26 is actuated and controlled by a presser lever 30 (see Figures 3 and 4) pivotally supported on the forward side of the vertical standard 31 mounted upon the base plate. This presser lever is provided with two wings extensions 32—32 which yoke about the anvil supporting sleeve 33 as a bearing extension of the standard 31, with one of said wings engaging the upper end of the plunger rod 29. The wing extension of the presser lever, at opposite sides of the anvil, place the clutch control at a point where the operator can actuate the same as the goods is held by both hands of the operator upon the anvil. This is very advantageous, and convenient, and makes the control substantially automatic, as the goods is positioned over the anvil to be ticketed.

For a single ticketing operation the operator is merely required to depress the lever 30 sufficient to swing the wedge or cam end of the trip bar 26 free from the pin 23, of the pawl, the pawl, being spring pressed, instantly snaps into the teeth 11 and connects the clutch sleeve 14 with the ratchet sleeve 10 which is rotating with the hollow shaft 8. The operator then immediately releases the presser lever 30 which swings to its normal position, due to the pressure of the spring 35 pressing against the lever arm 28, and this spring action thus also returns the trip bar to its normal pin intercepting position, to again engage the pawl pin 23 for cutting off the power at the end of a single revolution of the driving shaft 8.

*Tag feeding mechanism.*

Figure 2:
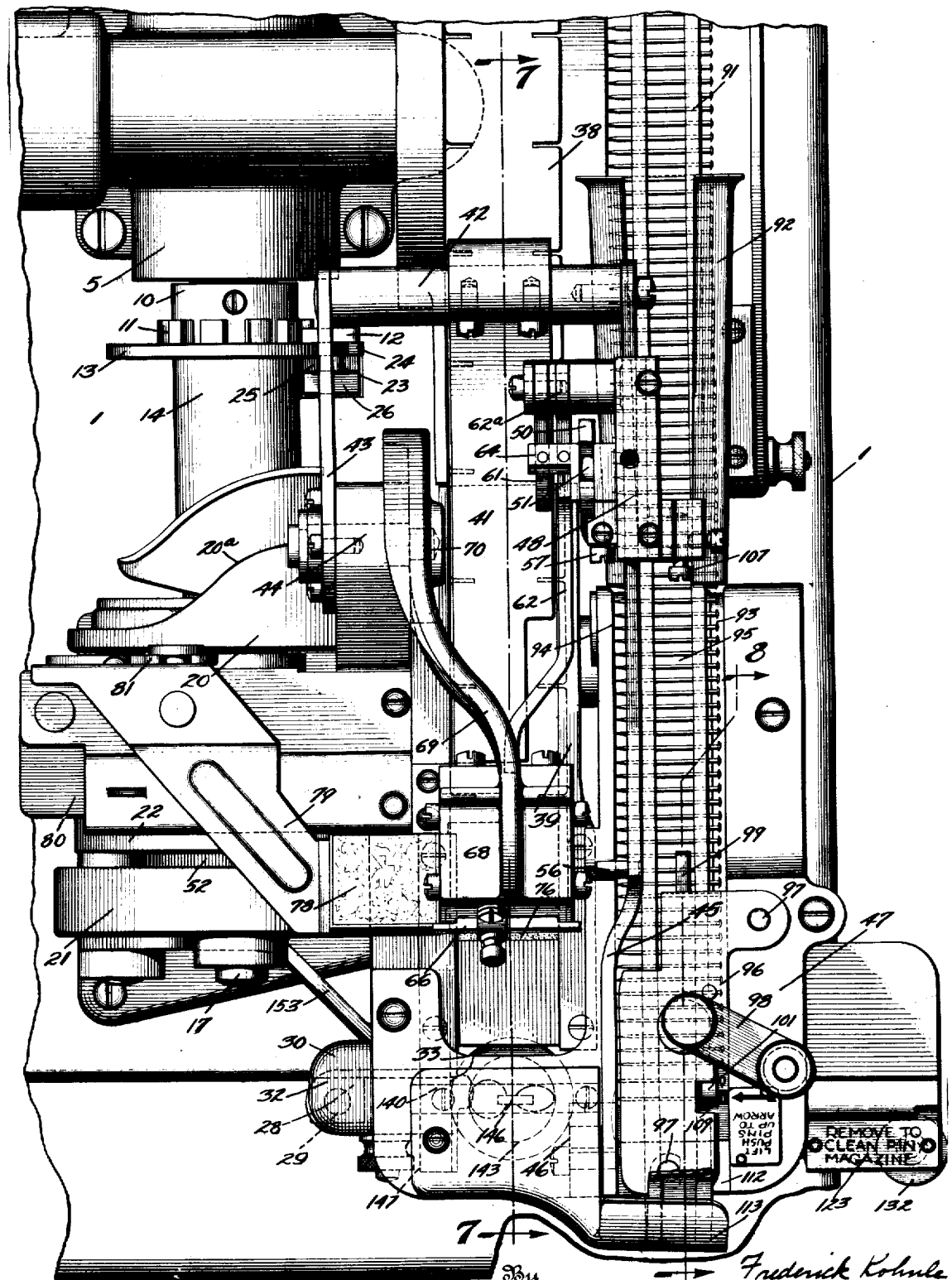
Figure 2 is a plan of the forward portion of the machine, the motor and tag strip and pin strip, housing and reel supporting casings being omitted.

The tags primarily are arranged in gang strip form in which each tag of the strip is identified by transverse notches at the opposite longitudinal edges of the strip. Those along one edge of the strip are utilized to provide shoulders which are consecutively engaged by a reciprocating feed finger, or fingers. The tag strip is reel wound as shown in Fig. 1, the core of the reel engaged upon a journaled spool 36 supported upon one of the side walls of the cage 37. The cage is shown as having a front wall or side hinged adapting the same to be swung open for loading. The tag strip 38 is fed from the reel downwardly upon the track or tag strip guide table 39, as a plate secured upon the top of the pedestal 31. The track or table is longitudinally grooved to recess the strip within the track and provide opposing guide walls, the wall or side adjacent the feed fingers as shown in Figure 6, having an inwardly extending flange or overhanging portion for guiding the strip edge against upward buckle when the feeding pressure is applied. A yielding pressure blade 41 extends longitudinally of the track over the tag strip and to a point forwardly when the strip in its feed reaches the printing or marking mechanism. The pressure blade has its rear end of coil formation, and secured to a bar 42, the bar 42 at one end being rigidly fixed to an arm 43 extending (see Figures 2 and 7) at an angle to the bar, and in turn fixed to a bearing extension 44 of the frame pedestal 31. The opposite end of the bar 42 provides a support to which one end of a horizontal guide rail 45 is secured. The opposite forward end of the guide rail 45 is fixed to a lug 46 extending upwardly from a table and anvil plate 47 fixed upon the tag strip guide table 39. A finger reciprocating carriage 48 is slidably engaged upon the guide rail 45, the carriage being reciprocated by a bell crank lever 49 pivotally supported to the pedestal frame 31. The lever is of two part form with an arm plate 50 adjustably secured to one arm of the lever, the upper end of the arm plate being forked to engage a pin 51 in the carriage 48. The bell crank lever 49 connects with a second bell crank lever 52 positioned at right angles to the lever 49 and pivoted upon a pintle 53 fixed to and extending from the bearing standard 19 (see Figures 4 and 5.) The end of the arm of the lever 52 connecting with the lever 49 is provided with an eye 54 engaging over a stem end of the arm of the lever 49 and furnishes a joint accommodating for relative arc motions of the levers on account of their right angle position. The second arm of the bell crank lever 52 at its free end is provided with a laterally extended lug journalling a roller engaged into the cam groove 55 of the duplex cam 21, a single revolution of the cam imparting a full reciprocation of the carriage. The carriage has a definite limit of forward stroke, for appropriately feeding the tag strip and end tag severed from the strip to bring the same to stations at which absolute registration can be had with the different parts of the machine operating upon the tags, and maximum throw of cam. Provision is made for adjustment as to regulate the limit of forward stroke of the carriage, and in relation to a rigid stop, as a pin 56 fixed to and extending laterally from the rail 45 designating the limit of forward carriage movement, and against which the carriage bears but not with any injurious force, the carried forward stroke limit being adjustable, by a set screw 57 extending from the forward end of the carriage for engaging the stop pin 56 primarily employed for a setting of the carriage stroke. The carriage initially is brought against the stop pin and the set screw adjusted as may be required, whereupon the arm plate 50 of the bell crank lever 49, is adjusted. In the present instance the arm plate 50 is pivotally mounted at 58 upon the upwardly extending arm of the bell crank lever 49 and the lower end of the arm plate 50 engaged by a bolt 59 extending through an arc slot 60 in the arm of the lever 49. This permits the arm plate to be sufficiently adjusted upon the lever and a proper coordination of the cam and levers is had to establish a limit of forward throw bringing the carriage in abutment with the stationary stop pin 56. As the part is idle on the retreat stroke no definite limit is required. The carriage movement however is sufficient for accommodating for the various of tag sizes operative in the machine to meet the general demand.

The carriage is provided with a pair of feed fingers 61, 62, pivotally mounted upon a common axis 62$^a$ extending laterally from the carriage supporting the fingers above the strip guide track or table. The fingers are of relatively different length, providing an extended reach of one beyond the other, one for feeding the strip and the second for feeding the printed and severed tag in a single forward stroke of the carriage.

Each finger at its free end is formed to provide a knife and shouldered edge for engagement with the strip and tag at the edge or shoulder formed in notching the strip, for severing the tag from the strip. The fingers are spring pressed downwardly and as shown in Figure 6, the fingers each are depressed by a coil spring 63 respectively seated in a socket or bore in a lug or support 64 extending from or a part of the carriage. The finger 61 of the shorter length is employed for feeding the strip and the finger 62 for the tag at the forward end of the strip after the tag has been printed upon and severed from the strip, to advance the tag to the station at which the tag is pinned upon the goods to be ticketed.

In Figure 21 the fingers and carriage are shown at their limit of forward stroke in which it will be recognized that the carriage abuts the stop pin 56, the finger 62 engaging the severed tag at approximately a central point having advanced or fed the tag to its final station in the machine where it is pinned to the goods. The finger 62 engages the tag centrally after it is severed from the strip for guidingly feeding the tag to avoid its canting and binding in the guide track or table or prevent it being moved out of square with the guiding edge of the track. The finger 61 is shown as engaged in the notch 65 of the tag strip bringing a successive tag at the printing and severing station.

Thus in the forward stroke of the carriage the severed tag as the end tag of the strip having been severed from the strip is advanced to a discharge position or station and the successive tag attached to the strip is positioned for printing and severing from the strip. For a single cycle of the cams or transmission only one tag is operated upon, that is the end tag of the strip, which at a starting point is positioned beneath the printing and severing mechanism, to be first printed upon and severed and then advanced for discharge or delivered to the station to be pinned to the goods, and, simultaneous with the advance of the printed and severed tags or at successive timed order with the advance thereof, the strip is fed to a tag width dimension to position the successive end tag of the strip beneath the printing and severing mechanism, for a second operating cycle. This is highly advantageous as no surplus supply of price-marked tags remain in the machine, leaving no opportunity for the operator to make error in applying a price-marked tag to the wrong piece of goods after a change of marking data has been made as occurs if any unused marked tags remain in the machine after a change in the marking data. The tag is marked and moved to a pin-on position after the merchandise to be marked has been placed in position to receive the tag and the presser lever 30 depressed.

The feed fingers are also controlled for imparting a relative different degree of feed. The finger 61 advances the strip a distance equal to the width of tag or spacing of the notches, while the finger 62 advances the cut-off tag such a distance as will appropriately bring the tag to a pin-on station, or discharge from the machine. This is not necessarily governed by the dimension of the tag, but as will allow for a sufficient throw-out clearance below the track for the merchandise and bring the rear edge of the tag a definite distance from the line at which the pin is to engage through the tag and merchandise preferably clear of the marking data printing on the tag.

To provide for the differential feed control between the strip feeding finger 61 and the tag feeding finger 62, the finger 61 for a portion of the length of the carriage travel slides upon the tension blade 41 out of contact with the strip. The forward portion of the blade is notched to permit the finger to engage with the foremost notch in the strip and when thus engaged the strip is only fed the distance of the remainder of forward carriage travel which is appropriately gauged with reference to the width of the tags for moving the strip accordingly bringing the notch along a registering line with the cutter blade severing the tag from the strip. The notch in the blade is of such longitudinal dimension as will only expose one notch in the strip and a portion of a second tag, as the strip is only advanced after the finger engages into a strip notch. This permits strips with relatively different width of tag to be fed in the machine without making any adjustments therefor, the spacing of the strip notches governing the distance of strip feed, it being recognized that with the carriage forward limit of travel regulated the notch engaged by the finger is brought to an exact registration with the cutting line of the cutter blade.

Tag printing and severing mechanism.

This mechanism in structure and operation is substantially the same as heretofore employed in tag marking machine and in particular to the class of machine shown and described in prior Letters Patent No. 1,484,136, issued February 19, 1924, therefore only a general description thereof will be made herein.

A type chase 66 replaceably holding type 67 is removably secured in a head member 68. The head 68 is an integral end of a lever 69 having a journal 70 fulcrumed in the bearing 44, from which the lever extends downwardly with its free end constructed as shown in Figure 25 for engagement with the cam 20.

The lever 69 carries a roller 71 mounted at the lower extremity of a link 72 pivoted at 73 upon the lever 69. The link midway of its length has an outstanding gear or lug 74 engaged against the end of a set screw 75 threaded through a laterally flanged portion of the lever. The screw and link provides means for adjusting the throw of the printing lever 69 as may be required for the degree of contact between the type and inking pad or the type and printing platen, the printing platen constituting a yieldable pad 76 having its upper surface recessed into the track or table beneath the printing head (see Figure 7) with its outer surface in plane with the surface of the track. The roller is yieldingly urged against the cam surface or flange 20$^a$ of the cam 20 by a spring 77 (see Figure 3) attached at one end to the frame of the machine with its opposite end having a hooked connection with the lever 69. The type is inked by engagement with an inking pad 78 at an appropriate time and interval, the inking pad being mounted upon the end of a yielding arm 79, (see Figure 2) slidably supported and reciprocating transversely to the track 39. The arm is slidably mounted upon a lateral extension 80 of the frame of the machine, and engaged by a lever 81 fulcrumed at 82 to the frame, the lever 81 carrying a roller which engages into the cam groove 83 of the cam 20.

In the operation of the machine a preferred method of operation relative of the printing and inking mechanism and to a cam cycle, the printing head in starting the machine is moved downwardly for making a printing impression upon the tag, disposed upon the printing platen and then moved upwardly whereupon a type pad which during the printing stroke of the printing head is idle, is moved in a forward stroke beneath the type carried by the printing head and then brought to rest or allowed to dwell at the limit of its forward stroke whereupon the printing head is again moved downwardly to a required degree to press the type upon the inking pad and under a sufficient pressure which has a tendency to yield the arm 79 which carries the pad for an efficient inking of the type and thereupon the head and printing pad are returned to their normal positions.

For cutting or severing the tags from the strip, a cutter or knife blade 84 is hingedly depended from the rear side of the printing head 68 (see Figure 7). The blade at one end is provided with a depending tang 85 which engages in a slotted guide block 86 fixed to the track or table. This guides the knife in its downward movement and along the cutting edge of the stationary cutting blade 87 recessed in the track or table. The cutting edge of the knife as shown in Figure 13 is inclined to effect a shear cut in severing the tag strip.

*Pinning mechanism.*

As the machine is primarily adapted for utilizing the common pin for securing the tag to the goods and applying the pin according to the method heretofore referred to, it is essential that the pins be positively fed in a consecutive manner to a pin driver by which the pin is forced through the tag and merchandise and against anvil surfaces for appropriately shaping or crimping the pin or otherwise operating upon the pin for securing the tag to the goods.

The pin feeding and delivering mechanism herein disclosed is susceptible of handling the pins under a high speed capacity, and in a manner in which there is practically no opportunity for clogging or injury to the pin, the freedom of the pin at some steps in the control being such so that it will drop by gravity from one position to a second.

The pins in the most commodious manner of handling either for merchandising as supplies for the machine or for feeding in the machine are magazined upon a strip of paper, and to a degree following a general practice of packing pins, in which the pins are inserted laterally through a pair of parallel corrugations in the strip and relatively equally spaced apart. The pin strip preferably is formed with its opposite longitudinal edges folded inwardly upon itself on one side so that the pin receiving longitudinal corrugations in the strip form the edges of the strip with the point and head ends of the pins respectively extending beyond the tape, for more convenient access to the pins, at the point end for squaring or aligning the pins in a guideway and at the head end for engagement in withdrawing the pin from the tape or strip. The pin carrying tape is preferably reel wound and loosely supported upon a core within the cage or compartment 90 as a part of the machine frame below the tag cage. The pin tape or strip 91 is threaded from the cage 90 into a tapering guide trough 92 having a flared mouth end, leading to a track or guide table 93 constituting a longitudinal grooved plate mounted upon the machine frame (see Figure 12) and at a slightly higher elevation than the track or guide table 39 for the tags. The grooving of the plate provides a guide wall 94 against which the pin points bear and track. The track or guide table 93 is arranged to provide a longitudinal clearance groove at the head end of the pins, which is formed by securing a spring steel strip 95 upon the upper surface of the groove base with the forward end projecting forwardly beyond the forward end of the track and yielding upwardly to provide a tension blade for the pin tape beneath the feeding mechanism. The pin tape or strip is advanced in step motions for consecutively feeding the pin to the drive mechanism at the forward end of the track.

The feeding mechanism for the pin tape is arranged as a self-contained unit removably mounted upon the machine to facilitate in loading and bringing the forward end of the tape with its pin properly beneath a tooth feed pawl or finger. The feeding unit comprises, a frame member 96 engaged upon upwardly extending pins 97—97 rigidly secured to the frame and held in place by a swinging latch arm 98. The underside of the frame member 96 is longitudinally grooved for receiving and mounting the toothed feed pawl or finger 99 and a pair of yieldingly urged presser fingers 100—101 respectively arranged at opposite sides of the feed pawl 99, (see Figures 8, 18, 19 and 23). The feed pawl 99 as shown in Figure 8 at its forward lower edge is provided with a plurality of saw-teeth 102, four in number, of a gauge approximating the pin spacing on the pin strip, adapting the pins to be engaged by the shoulders of the teeth when the pawl is moved in a feeding direction, with the inclined portions of the teeth serving to elevate the pawl and ride over the pins in a retreat motion of the pawl. The pawl is pivotally mounted in its groove in the frame member, by a pin 103 secured in the frame and engaged through a notch 104 extending longitudinally into the rear end of the pawl. The forward end pawl above the teeth is depressed by a spring 105 seating in the frame member 96. A second spring 106 is connected to the pawl and to a hook fixed to the frame for automatically retracting the pawl.

The pawl is moved forwardly by the tag feeding carriage 48, the carriage being provided with a forwardly extending set screw 107 which engages the rear end of the pawl in the forward travel of the carriage and toward the limit of forward carriage stroke.

The feeding stroke of the pawl approximately equals the spacing distance of the pins and the regulation of the stroke is made by adjusting the screw 107 as may be required. The presser fingers 100, 101, likewise are hingedly mounted within respective grooves in the frame member and their forward ends are yieldingly depressed by springs 108 seated in the framework. The presser fingers extend slightly beyond the forward end of the feeding pawl with the inside finger 100 having a lower forward edge grooved as shown in Figure 18, providing a toothed end for engaging the foremost pin 109 in the strip to prevent retrograde movement of the strip and pin, and the outer finger 101 projects slightly beyond the end of the finger 100 with its lower forward edge being rounded or inclined to form a dull knife edge for engaging over the pin to incline the pin at the head end downwardly as shown in Figure 23, the pressure blade being notched at its forward end as shown in Figure 20 to provide a clearance slot or notch 110 and a tongue 111. The notch 110 provides a clearance in the pressure blade for the feeding pawl 99. The tongue is of a reduced length so as to clear the foremost pin of the strip but support the next adjacent or successive pin while the normal length of the blade beneath the inner finger 100 extends beyond the finger to guide and support the tape as the pin has been extracted for discharging the tape from the machine. As shown in Figure 8, the tape is fed beneath a cross bar 112 having an inclined or guiding forward surface for directing the strip downwardly and into the discharging guide 113. With the head end of the pin relieved from the pressure blade the pin is canted bringing the head downward for engagement by an extracting claw 114 of a shuttle mechanism (see Figures 21, 22 and 23). The claw or extractor 114 is mounted to be reciprocated transversely to the direction of pin strip feed or longitudinally of the pins in the tape, and structurally comprises a rectangular member, longitudinally centrally notched to provide an aperture 115 therethrough to receive the head of the pin and a reduced width slot 116 leading from the aperture to receive the shank or body of the pin and provide claw edges 117 for engaging the rear side of the pin head for withdrawing the pin in the forward stroke of the claw from the tape. The claw is arranged in a superposed relation to a driver 118 as a unit therewith, the driver extending beyond the forward end of the claw and having its upper surface longitudinally grooved to provide a guide channel 119 to receive the pin after it is released by the claw at the limit of the forward stroke of the shuttle.

The claw and driver in their superposed relation are spaced to receive an intervening stationary pin guide or raceway 120 for transferring the pin from the claw to the driver. In the forward stroke of the claw after it has withdrawn the pin from the tape, the pin will drop by gravity onto the race-way 120 as shown in Figure 21 with the head of the pin still confined within the aperture 115 of the claw. With the forward stroke of the shuttle the pin head is engaged by the rear wall 121 of the aperture in the claw as an abutment for conveying the pin forwardly and through the opening 122 in the race-way into the channel 119 of the driver 118. The pin lying in the race-way brings the point of the pin below the plane of the race-way plate 123 and in a position to be forced downwardly by engagement with the beveled surface 124 in the plate 123 beyond the opening 122 as the pin is moved forwardly by the claw and thereupon deposited upon the driver below the race-way, with the head end of the pin in the opening so as to engage with the wall or shoulder 125 at the forward end of the race-way, for arresting longitudinal motion of the pin on a second retreat stroke of the shuttle. This allows the driver in a retreat stroke to be drawn from beneath the pin and to descend by gravity in front of the end of the driver in the driver guide-way. The shuttle provides for operating upon two pins, on each stroke of the shuttle. For the retreat stroke, as shown in Figure 23, one pin is being positioned in front of the driver and a second or successive pin in the process of being extracted or withdrawn from the tape. A forward stroke of the shuttle drives the first pin into the tag or ticket and merchandise and the second pin is delivered from the claw upon the driver. This provides for a very rapid and positive feed control of the pins and in a manner which leaves no opportunity for clogging or injury to any of the pins in the transfer from the tape to the position for applying the pin to the goods.

For convenience in construction of the shuttle the claw 114 is formed integral with a plate portion 126 and the driver 118 is integral with a plate portion 127 which is rigidly fixed to the plate portion 126 providing a channel 128 therebetween, for receiving a guide bar 129 of a base plate 130 slidingly mounting the claw and driver, with the driver sliding upon the guide ledge 131 of the base plate 130 which base plate on its upper side is of off-set formation, to guidingly mount the claw and driver unit. The guide plate 123 is formed to be removably fixed upon the base plate and abuts against the side of the ledge 130 for the driver guide channel, and is provided with a flange which forms the stationary pin raceway interposed between the claw and driver.

The base plate for the shuttle is appropriately rigidly secured to the machine frame and the guide plate 123 removably secured to the base plate by a set screw 132. The claw and driver unit is reciprocated, by a lever 133 having its rear end pivoted at 134 to the table portion of the machine frame, and its forward end has a socket connecting with the claw and driver unit. (See Figure 11). The lever has an oblong slot 135 therethrough into which a tongue 136 of a slide or reciprocating bar 136ª engages for connecting the bar and lever. The bar is slidably mounted in a guide-way formed in the machine frame 40 beneath the tag and pin tape tracks or guide-ways, and connects with a second lever 137, extending vertically having its lower end suitably pivoted at 138 to the machine frame. The lever 137 is provided with a laterally extended pin or journal carrying a roller, engaged into the cam groove 139 of the cam 22.

Merchandise ticket mechanism.

The tag after being price marked and severed from the strip is advanced, bringing the same beneath a stationary die plate or block 140 (see Figure 23) removably secured to the frame 141 which supports the pin shuttle and provides the track for the pin tags leading to the shuttle. This frame 141 is secured to the main frame of the machine and made separable therefrom for convenience in machining and assembly of the parts. The die is suitably formed to cooperate with an anvil at the head end of a plunger which moves against the die, to clamp the tag and goods therebetween, in a bowed or curved form to permit the pin to be passed longitudinally through the tag and goods several times, and for bending or crimping the point end of the pin to anchor the same to the tag and guard the pin point. For applying the pin in securing the tag to the goods under a preferred method the die is recessed or concaved as at 142, to provide a curved surface against which the tag and goods to be ticketed is pressed by the anvil end of the plunger 143 slidably movable in the bearing sleeve 33 integral with the machine frame. The anvil surface is complementary to that of the die recess 142 for giving the tag and the material a corrugated form when pressed therebetween. At the forward end of the concavity the die 140 is notched as at 145 to provide an inclined mouth or passage in line with the pin driver 118 for guiding and directing the pin across the die and anvil. The anvil also is appropriately channeled to form a passage and anvil surface, the surface 146 being inclined to direct the pin upwardly as it is making its second pass through the tag and material and against the rear end of the cavity 142, such portion of the die surface directing the pin point downward and effecting a slight bending of the pin and to direct the pin against a stationary die plate 147 beneath the rear end of the die 146 which also serves as a tongue for the lower edge of the tag 148 to hold the same aloft from the material for permitting the point end of the pin to be passed finally only through the tag and thence bent or inclined to bring the point into the tag to guard the point.

The plunger 143 (see Figure 4) is of shell form to telescopically receive the plunger rod 149 which yieldingly connects with the plunger through a spring 150, which compensates for a continuing motion of the rod to complete its stroke after the plunger has been arrested by compressing the material and tag against the stationary die plate giving the tag and material a corrugated form, and sufficiently clamping the same for driving the pin therethrough. The plunger shell at its lower end is longitudinally slotted as at 151 to receive a pin 152 extending from the plunger rod to key the shell against rotary motion. The lower end of the plunger rod is connected to a bell crank lever 153 by means of a pin 154 extending laterally from the plunger rod and into a slot 155 in the end of an arm of the bell crank lever 153 to provide a flexible connection. The bell crank lever is suitably pivoted to the machine frame and connects with the cam 21 by means of a roller journaled on the end of the second arm of the lever, engaging into an endless cam groove 156 in the side face of said cam 21. The cam groove is formed to provide a dowel in the plunger reciprocating when compressing the material against the die for a pinning interval.

In an operation of the machine upon a forward stroke of the carriage 48 carrying the feed fingers 61 and 62, the foremost tag which during a preceding operation has been positioned beneath the printing head and severed from the strip, is fed between the clamping and forming dies 140, 143, for applying the pin securing the tag to the goods. The various parts of the machine are coordinately timed so as to operate in a particular order. The foremost tag beneath the printing head is fed forward prior to a successive feeding of the strip to permit the tag to be fed a greater distance than is required for the feed of the strip, and also for the purpose of appropriately bringing the tag between the dies which are positioned a distance in advance of the printing mechanism for giving sufficient clearance for access to the dies. As the tag strip feeding finger 61 for a portion of the carriage stroke rides upon the pressure blade 41, it cannot feed the strip until it has cleared the forward end of said blade. This arrangement provides for a variable degree of feed between the tag strip and foremost severed tag to a given length of carriage stroke.

The tag strip and tag feeding control provides for discharging each printed tag from the machine so that no surplus supply of printed tags remain in the machine. The tag when positioned between the dies, has one edge thereof sustained in the guide or die plate 147, and as shown in Figure 23, the die is provided with a projecting anvil lip for sustaining the lower edge of the tag free from the material to which the tag is applied, and for bending the pin to bring its point into the tag. This brings the point portion of the pin between the tag and material. Successive to a clamping operation of the tag and material between the dies, the pin transferring and driving shuttle is operated for extracting a pin from the pin carrying tape, and driving a second pin into the tag and material clamped between the dies.

Having described my invention, I claim:

1. In a machine of the character disclosed, opposing dies one thereof movable for clamping a piece of tag material therebetween and giving the same a temporary curved form, said dies grooved to provide a pin receiving way and anvil surfaces for directing a pin through the material transversely of the curvature thereof and crimping the point of the pin into the material and means for driving a pin into said way and between said anvil surfaces of said dies.

2. In a machine of the character disclosed, opposing dies, one thereof movable for clamping a tag therebetween and formed to give the tag a temporary curved form, said dies grooved to provide a pin receiving way and anvil surfaces for directing a pin through the tag transversely of the curvature thereof and crimping the point of the pin into the tag, and means for driving a pin into said way and between said anvil surfaces of said dies, and guide means supporting an edge of the tag for feeding and sustaining the tag between the dies prior to being clamped by the dies.

3. In a machine of the character disclosed, opposing members one thereof movable for clamping a tag and material to be tagged therebetween, the members being complementary formed to give the tag and material a temporary curvature when clamped, said members formed for directing a pin through the material transversely of the curvature thereof and provided with anvil surfaces for bending the point end of the pin to incline and direct the same into the tag, during the insertion of the pin, and means for driving a pin into said way and between said anvil surfaces of said dies.

4. In a machine of the class described, a stationary die having a curved face, a reciprocating plunger movable toward and from said die having a die head complementary to the curved face of said stationary die, for clamping a tag and material to be tagged and give them a curved form, said die and plunger provided with anvil surfaces to receive and direct a pin inserted transversely to the curvature, through the tag and material applying the tag to the material and an anvil member beneath the die for sustaining an edge portion of the tag from the material and cooperating with said stationary die for bending the point portion of the pin toward the underside of the tag portion sustained by said anvil member, and means for inserting a pin through said tag and material between said dies.

5. In a machine of the character disclosed, a stationary die, a guide for tracking and sustaining a tag beneath the stationary die, a movable die having a surface complementary to the die surface of said stationary die for receiving the material to be tagged beneath the tag and compress the tag and material against the stationary die and give said tag and material a temporary curved form with the guided edge of the tag free from the material for inserting a pin through the tag and material jointly and transversely of the curvature thereof, and through the tag individually at its guided end whereby the point portion of the pin will lie between the tag and material and means for driving a pin into said way and between said anvil surfaces of said dies.

6. In a machine of the character disclosed, a guide way providing a channel for tracking a pin carrying strip, the pins arranged in the strip relatively parallel, uniformly spaced and transversely to the longitudinal line of the channel, and means for advancing the pin strip in step degrees, comprising a claw mounted for reciprocation longitudinally of the direction of pin advance, and hinged to swing transversely to its direction of reciprocation, for engagement with one or more pins of the strip for advancing the strip in one reciprocal stroke of the claw.

7. In a machine of the character disclosed, a channel for tracking a pin carrying strip, the pins arranged in the strip relatively parallel, uniformly spaced and transversely to the longitudinal line of the channel, a claw mounted for reciprocation in a direction of pin strip advance, and yieldingly depressible transversely to its direction of reciprocation, for engagement with one or more pins of the strip for advancing the strip in one reciprocal stroke of the claw.

8. In a machine of the character disclosed, a channel for tracking a pin carrying strip, the pins arranged in the strip relatively parallel, uniformly spaced and transversely to the longitudinal line of the channel, a claw mounted for reciprocation in a direction of pin strip advance, yieldingly depressible transversely to its direction of reciprocation, for engagement with one or more pins of the strip for advancing the strip in one reciprocal stroke of the claw, and means for positively moving said claw in a strip advancing stroke and a spring for retracting the same.

9. In a machine of the character disclosed, a support for tracking a pin carrying strip, the pins arranged in the strip in spaced parallelism transversely of the strip, a claw mounted for reciprocation in a strip advancing direction, and depressible to engage one or more pins for successively advancing the pins and the strip with the claw reciprocation.

10. In a machine of the character disclosed, a yielding support for tracking a pin carrying strip thereon, the pins arranged in the strip in spaced parallelism, transversely of the strip with a portion of each pair exposed from the upper side of the strip, a claw mounted for reciprocation longitudinally of the strip and depressible for engaging its claw portion upon one or more pins and over a notched portion in said yielding support whereby the opposing pressures of claw and support prevent pin displacement from the claw in a feeding stroke of the claw.

11. In a machine of the character disclosed, a yielding support for tracking a pin closed, a yielding support for tracking a pin carrying strip thereon, the pins arranged in the strip in spaced parallelism, transversely of the strip with a portion of each pair exposed from the upper side of the strip, a claw mounted for reciprocation longitudinally of the strip and depressible for engaging its claw portion upon one or more pins and over a notched portion in said yielding support whereby the opposing pressures of claw and support prevent pin displacement from the claw in a feeding stroke of the claw, means for actuating said claw in a stroke feeding direction, and means for retracting said claw.

12. In a machine of the character disclosed, a support for tracking a pin carrying strip, the pins arranged in the strip in spaced parallelism transversely of the strip, a claw mounted for reciprocation longitudinally of the strip for successive pin and strip advance upon the support, a depressible finger for engaging the head end of the foremost pin strip for canting the pin and bringing its head below the plane of the support, and a reciprocatory pin extractor operable for engaging the depressed head of the pin and withdrawing the pin longitudinally from the strip.

13. In a machine of the character disclosed, a support for tracking a pin carrying strip, the pins arranged in the strip in spaced parallelism transversely of the strip, a claw mounted for reciprocation longitudinally of the strip for successive pin and strip advance upon the support, and a reciprocatory pin extractor operable for engaging the head of a pin and withdrawing the pin longitudinally from the strip.

14. In a machine of the character disclosed, means for feeding a pin carrying web in degree successively, the web having the pins arranged in spaced parallelism transversely of the web, with the head of the pins exposed from one edge of the web, and reciprocating shuttle means, movably longitudinally of the pins engaging the head of a pin in one stroke of the shuttle means withdrawing the pin from the web, and in a reverse stroke discharging the withdrawn pin from the shuttle.

15. In a machine of the character disclosed, a stationary die, a guide for tracking and sustaining a tag beneath the stationary die, a movable die having a surface complementary to the die surface of said stationary die for receiving the material to be tagged beneath the tag and compressing the tag and material against the stationary die and giving said tag and material a temporary curved form with the guided edge of the tag free from the material for inserting a pin through the tag and material jointly transversely of the curvature thereof, and through the tag inclined at its guide end whereby the point portion of the pin will lie between the tag and material, means for feeding a pin carrying web in degree successively, the web having the pins arranged in spaced parallelism transversely of the web, with the head of the pins exposed from one edge of the web, and reciprocating shuttle means, disposed in relation to said dies movably longitudinally of the pins, engaging the head of a pin in one stroke of the shuttle means withdrawing the pin from the web, and in a reverse stroke discharging the withdrawn pin from the shuttle, and driving the same into the tag and material clamped between said dies.

16. In a tag attaching machine, cooperating die members for appropriately clamping a tag and material to be tagged for the insertion of a pin, a shuttle for successively withdrawing a pin from a pin carrying strip, the pins being disposed in spaced parallelism crosswise of the strip, said shuttle comprising, superposed reciprocating claw and driver members the claw member engaging the head of a pin in the pin carrier strip, extracting the same therefrom and alternately transferring the pin to the driver, and said driver forcing the pin through the tag and material between the clamping dies.

17. In a tag attaching machine, cooperating die members for appropriately clamping a tag and material to be tagged for the insertion of a pin, and a shuttle for successively extracting the pins from a pin carrying strip, the pins being disposed in spaced parallelism crosswise of the strip, and forcing the extracted pin through the tag and material between the clamping dies, securing the tag to the material.

18. In a tag attaching machine, cooperating die members for appropriately clamping a tag and material to be tagged for the insertion of a pin, means for successively feeding the tags to and between the dies, a reciprocating shuttle for successively withdrawing a pin from a pin carrying strip, the pins being disposed in spaced parallelism crosswise of the strip, forcing the pin through the tag and material between the clamping dies, and means for intermittently feeding the pin strip for presenting the pins successively to the shuttle.

19. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins into line for insertion into the tag and material between the dies, and a shuttle for transferring the pins from the pin strip to the tag and material between the dies.

20. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins into line for insertion into the tag and material between the dies, a reciprocating shuttle for transferring the pins successively from the pin strip to the tag and material between the dies, and feeding means for successively advancing a tag to and between the die in timed relation to said shuttle.

21. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins into line for insertion into the tag and material between the dies, a reciprocating pin extractor for successively withdrawing the pin from the pin carrying strip at one elevation and transferring the same to a second elevation, and a reciprocating driver, for receiving the pins successively from said second elevation and transferring the same to a position in advance of the driver and to be driven thereby into the tag and material between the dies.

22. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins to a position to be transferred from the strip to a position to be inserted into the tag and material, a shuttle mechanism for transferring the pins and driving the same into the tag and material between the dies, comprising a movable claw member for extracting the pin from the strip, transferring the same to a driver at a lower elevation and a driver movable to receive the pin transferred by the claw and force the same through the tag and material between the dies.

23. In a machine of the class described, a pair of parallel guides, one for tracking a gang tag strip, and the second a pin carrying strip, with the pins disposed in spaced parallelism crosswise of the strip, a carriage reciprocating longitudinally of said guides, a pair of fingers on said carriage relative to the tag strip guide one thereof cooperating with the tag strip to advance the strip and the second finger to cooperate with a foremost severed tag of the strip to advance the same to a discharge station, pin feeding means for intermittently advancing said pin carrying strip, engageable and operated by said carriage toward its limits of a tag feeding stroke, means for holding said foremost tag at its discharge station for the insertion of a pin therethrough, and means for transferring a pin from said strip to the tag.

24. In a machine of the class described, a guide for tracking a gang tag strip, a carriage reciprocating longitudinally of said guide, and a pair of fingers on said carriage relative to the tag strip guide one thereof cooperating with the tag strip to advance the strip and the second finger cooperating with a foremost severed tag of the strip to advance the same to a discharge station.

25. In a machine of the class described, a pair of parallel guides, one for tracking a gang tag strip, and the second a pin carrying strip, with the pins in the strip disposed in spaced parallelism crosswise of the strip, a carriage reciprocating longitudinally of said guides, having means cooperating with the tag strip to advance the strip and a foremost severed tag of the strip to a discharge station, pin feeding means for intermittently advancing said pin carrying strip, engageable and operated by said carriage toward its limits of a tag feeding stroke, means for holding said foremost tag at its discharge station for the insertion of a pin therethrough, and means for transferring a pin from said strip to the tag.

26. In a machine of the class described, a pair of parallel guides, one for tracking a gang tag strip, and the second a pin carrying strip, with the pins in the strip disposed in spaced parallelism crosswise of the strip, a carriage reciprocating longitudinally of said guides, cooperating with the tag strip to advance the strip and a foremost severed tag of the strip to a discharge station, pin feeding means for advancing said pin carrying strip, intermittently operated by said carriage, and means for transferring a pin from said strip to the foremost tag located in the station.

27. In a machine of the class described, means for supporting and tracking a tag strip, a reciprocating carriage for advancing the strip, a pair of fingers mounted on said carriage and arranged to extend one in advance of the other, one finger adapted to engage with the strip for a limited portion of the carriage movement in an advancing direction and the second to engage the foremost tag of the strip and advance the same when severed for the full stroke of the carriage, whereby the tag and strip are fed at relative different degrees.

28. In a machine of the class described, means for supporting and tracking a tag strip, a reciprocating carriage for advancing the strip, a pair of fingers mounted on said carriage and arranged to extend one in advance of the other, one finger adapted to engage with the strip for a limited portion of the carriage movement in an advancing direction and the second to engage the foremost tag of the strip and advance the same when severed for the full stroke of the carriage, and severing means for cutting the foremost tag from the strip preceding the advance of said tag and strip.

29. In a machine of the class described, means for supporting and tracking a tag strip, a reciprocating carriage for advancing the strip, a pair of fingers mounted on said carriage and arranged to extend one in advance of the other, one finger adapted to engage with the strip for a limited portion of the carriage movement in an advancing direction and the second to engage the foremost tag of the strip and advance the same when severed for the full stroke of the carriage, movable cutter supporting means, and a cutter blade hingedly mounted thereon for severing the foremost tag of the strip, said cutter guided in its motion.

30. In a tag applying machine, cooperating die members, one thereof movable, for clamping a tag and material to be tagged between said dies and giving the same a form for the insertion of a pin therethrough, means for actuating said movable die member, including a source of power and a clutch, and clutch controlling means including a lever located in relation to said dies, to provide a hand rest for the operator while inserting the material to be tagged between said dies and thereby enabling a hand hold control of said clutch holding the material for a tagging operation.

In witness whereof, I hereunto subscribe my name.

FREDERICK KOHNLE.

DISCLAIMER 1,667,810.—*Frederick Kohnle*, Dayton, Ohio. TICKET OR TAG ATTACHING MACHINE. Patent dated May 1, 1928. Disclaimer filed February 7, 1935, by the assignee, *The Monarch Marking System Company*.

Hereby enters this disclaimer to claims 17, 18, 19, and 20 thereof, to wit:

"17. In a tag attaching machine, cooperating die members for appropriately clamping a tag and material to be tagged for the insertion of a pin, and a shuttle for successively extracting the pins from a pin carrying strip, the pins being disposed in spaced parallelism crosswise of the strip, and forcing the extracted pin through the tag and material between the clamping dies, securing the tag to the material.

"18. In a tag attaching machine, cooperating die members for appropriately clamping a tag and material to be tagged for the insertion of a pin, means for successively feeding the tags to and between the dies, a reciprocating shuttle for successively withdrawing a pin from a pin carrying strip, the pins being disposed in spaced parallelism crosswise of the strip, forcing the pin through the tag and material between the clamping dies, and means for intermittently feeding the pin strip for presenting the pins successively to the shuttle.

"19. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins into line for insertion into the tag and material between the dies, and a shuttle for transferring the pins from the pin strip to the tag and material between the dies.

"20. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins into line for insertion into the tag and material between the dies, a reciprocating shuttle for transferring the pins successively from the pin strip to the tag and material between the dies, and feeding means for successively advancing a tag to and between the die in timed relation to said shuttle."

[*Official Gazette March 5, 1935.*]

station for the insertion of a pin therethrough, and means for transferring a pin from said strip to the tag.

26. In a machine of the class described, a pair of parallel guides, one for tracking a gang tag strip, and the second a pin carrying strip, with the pins in the strip disposed in spaced parallelism crosswise of the strip, a carriage reciprocating longitudinally of said guides, cooperating with the tag strip to advance the strip and a foremost severed tag of the strip to a discharge station, pin feeding means for advancing said pin carrying strip, intermittently operated by said carriage, and means for transferring a pin from said strip to the foremost tag located in the station.

27. In a machine of the class described, means for supporting and tracking a tag strip, a reciprocating carriage for advancing the strip, a pair of fingers mounted on said carriage and arranged to extend one in advance of the other, one finger adapted to engage with the strip for a limited portion of the carriage movement in an advancing direction and the second to engage the foremost tag of the strip and advance the same when severed for the full stroke of the carriage, whereby the tag and strip are fed at relative different degrees.

28. In a machine of the class described, means for supporting and tracking a tag strip, a reciprocating carriage for advancing the strip, a pair of fingers mounted on said carriage and arranged to extend one in advance of the other, one finger adapted to engage with the strip for a limited portion of the carriage movement in an advancing direction and the second to engage the foremost tag of the strip and advance the same when severed for the full stroke of the carriage, and severing means for cutting the foremost tag from the strip preceding the advance of said tag and strip.

29. In a machine of the class described, means for supporting and tracking a tag strip, a reciprocating carriage for advancing the strip, a pair of fingers mounted on said carriage and arranged to extend one in advance of the other, one finger adapted to engage with the strip for a limited portion of the carriage movement in an advancing direction and the second to engage the foremost tag of the strip and advance the same when severed for the full stroke of the carriage, movable cutter supporting means, and a cutter blade hingedly mounted thereon for severing the foremost tag of the strip, said cutter guided in its motion.

30. In a tag applying machine, cooperating die members, one thereof movable, for clamping a tag and material to be tagged between said dies and giving the same a form for the insertion of a pin therethrough, means for actuating said movable die member, including a source of power and a clutch, and clutch controlling means including a lever located in relation to said dies, to provide a hand rest for the operator while inserting the material to be tagged between said dies and thereby enabling a hand hold control of said clutch holding the material for a tagging operation.

In witness whereof, I hereunto subscribe my name.

FREDERICK KOHNLE.

DISCLAIMER 1,667,810.—*Frederick Kohnle*, Dayton, Ohio. TICKET OR TAG ATTACHING MACHINE. Patent dated May 1, 1928. Disclaimer filed February 7, 1935, by the assignee, *The Monarch Marking System Company*.

Hereby enters this disclaimer to claims 17, 18, 19, and 20 thereof, to wit:

"17. In a tag attaching machine, cooperating die members for appropriately clamping a tag and material to be tagged for the insertion of a pin, and a shuttle for successively extracting the pins from a pin carrying strip, the pins being disposed in spaced parallelism crosswise of the strip, and forcing the extracted pin through the tag and material between the clamping dies, securing the tag to the material.

"18. In a tag attaching machine, cooperating die members for appropriately clamping a tag and material to be tagged for the insertion of a pin, means for successively feeding the tags to and between the dies, a reciprocating shuttle for successively withdrawing a pin from a pin carrying strip, the pins being disposed in spaced parallelism crosswise of the strip, forcing the pin through the tag and material between the clamping dies, and means for intermittently feeding the pin strip for presenting the pins successively to the shuttle.

"19. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins into line for insertion into the tag and material between the dies, and a shuttle for transferring the pins from the pin strip to the tag and material between the dies.

"20. In a tag attaching machine, cooperating dies for appropriately clamping a tag and material to be tagged for the insertion of a pin to secure the tag to the material, feeding mechanism for intermittently advancing a pin carrying strip, the pins disposed in spaced parallelism crosswise of the strip, successively bringing the pins into line for insertion into the tag and material between the dies, a reciprocating shuttle for transferring the pins successively from the pin strip to the tag and material between the dies, and feeding means for successively advancing a tag to and between the die in timed relation to said shuttle."

[*Official Gazette March 5, 1935.*]